United States Patent [19]

Bisiach

[11] Patent Number: 4,827,790
[45] Date of Patent: May 9, 1989

[54] SYSTEM FOR THE AUTOMATIC RECOVERY OF PLAY BETWEEN A WORM AND WORM GEAR

[75] Inventor: Luciano Bisiach, Turin, Italy

[73] Assignee: Bisiach & Carru' S.p.A., Venaria, Italy

[21] Appl. No.: 113,696

[22] Filed: Oct. 28, 1987

[30] Foreign Application Priority Data

Dec. 2, 1986 [IT] Italy ............................... 67894 A/86

[51] Int. Cl.⁴ .................. F16H 1/16; F16H 35/06; F16H 55/24
[52] U.S. Cl. .......................................... 74/425; 74/398; 74/409
[58] Field of Search ................ 74/89.14, 396, 398, 74/409, 425; 267/162, 177

[56] References Cited

U.S. PATENT DOCUMENTS

| | | | |
|---|---|---|---|
| 1,035,340 | 8/1912 | Fresh | 74/398 |
| 1,841,937 | 1/1932 | Byrd | 74/396 |
| 2,554,224 | 5/1951 | Tabor | 74/396 X |
| 2,771,169 | 11/1956 | Wahlstrom | 74/396 X |
| 2,850,274 | 9/1958 | Villar | 267/177 X |
| 3,202,015 | 8/1965 | Moul, Jr. et al. | 74/425 X |
| 3,339,426 | 9/1967 | Borggrafe | 74/425 |
| 3,463,030 | 8/1969 | Nuccel | 74/396 X |
| 4,040,307 | 8/1977 | Koster | 74/425 |
| 4,065,685 | 12/1977 | Newell | 310/83 X |
| 4,541,294 | 9/1985 | Byers | 74/425 X |

FOREIGN PATENT DOCUMENTS

| | | | |
|---|---|---|---|
| 2375572 | 8/1978 | France | 74/425 |
| 733827 | 7/1955 | United Kingdom | 74/398 |

*Primary Examiner*—Allan D. Herrmann
*Attorney, Agent, or Firm*—Beveridge, DeGrandi & Weilacher

[57] ABSTRACT

An improved system for the automatic recovery of play between a worm and a worm gear, particularly in welding robots, the system being formed by at least one resilient member of the cup spring type or the like, acting perpendicularly to the axis of rotation of the worm.

7 Claims, 3 Drawing Sheets

SYSTEM FOR THE AUTOMATIC RECOVERY OF PLAY BETWEEN A WORM AND WORM GEAR

BACKGROUND OF THE INVENTION

This invention relates to an improved system for the automatic recovery of play between a worm and worm gear.

It has sometimes been found that, when a rotating member, for example, a worm mechanism has to transfer its rotary movement to another member connected thereto, for example, a worm gear, particularly a worm gear carrying heavy loads, the phenomenon of wear and deformation of the contacting surfaces between the rotary members is accentuated, sometimes in such an evident manner that the exact position of the operating means, which may be connected thereto, is modified and shifted.

In particular, in industrial processes using robots—particular reference is made here to welding robots and general universal manipulators—it is of extreme importance to maintain, even after a great number of operating cycles on successive parts, the greatest possible accuracy of positioning of the operating unit at the working points contemplated in the design phase and required by the working cycle.

Although the systems that are at present used in mechanical engineering to recover the wear or deformation between a worm and worm wheel are relatively reliable, they have the great drawback that they are at the same time also considerably complex and expensive, above all because of the great number of components used for making the system.

Further, the known systems normally act substantially on the axis of the worm, pushing it and keeping it constantly in engagement with the teeth of the worm gear by hydraulical or mechanical pushing means. Although at first sight these systems may appear to be efficient, in reality they cause rapid wear of the contacting surfaces and thus necessitate a more frequent replacement of the gears.

It is an object of the present invention to provide a system that is capable of recovering the wear occurring on the contacting surfaces between the meshing teeth of a worm and worm gear and at the same time can make up for the play that may be produced by a geometric deformation of the worm gear, so that when the aforementioned drawbacks occur, the member connected to the worm gear can nevertheless always assume exact angular positions.

Finally, but certainly not less important, the system must be such that it can be easily manufactured and must be of very reduced cost.

In other words, the invention reverses the general concept of recovery of the play between a worm and worm gear by providing a system adapted to maintain constantly equal relative to one another a repetitive sequence of angular displacements made by the worm gear so as to obtain a precise reproducibility of positioning, all to the advantage of the quality of the product being machined.

SUMMARY OF THE INVENTION

These and other objects and advantages of the invention, which will become apparent from the following description, are achieved by an improved system for the automatic recovery of play between a worm and worm gear, characterized in that the worm is resiliently biased towards the worm gear in a direction substantially radial to the worm gear.

DESCRIPTION OF PREFERRED EMBODIMENTS

Figure 1:
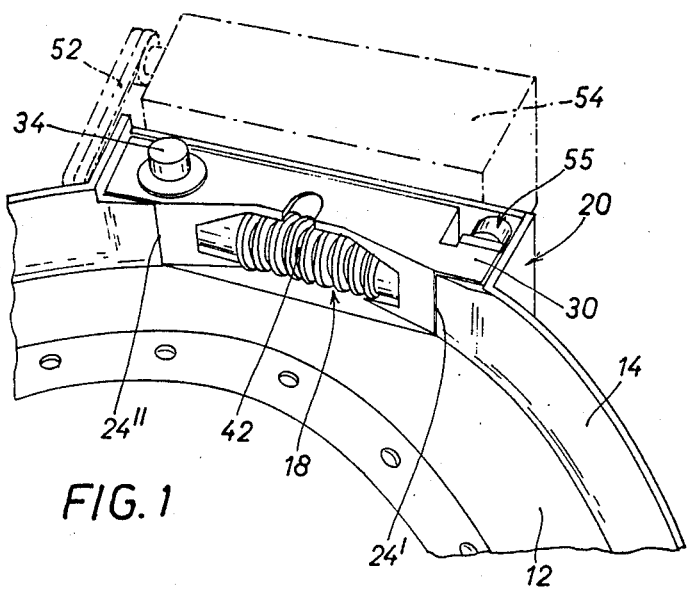
FIG. 1 is a perspective view of an improved system according to the invention for the automatic recovery of play between a worm and worm gear in which for greater clearness of illustration the worm gear has not been shown.
Figure 2:
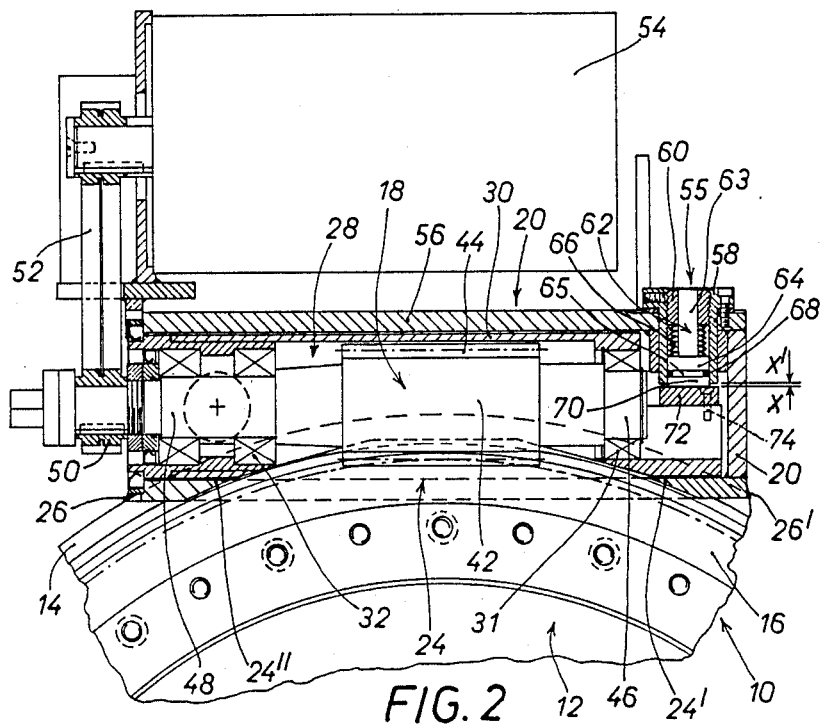
FIG. 2 is a diagrammatic plan view of the improved system for the automatic recovery of play according to the invention.
Figure 3:
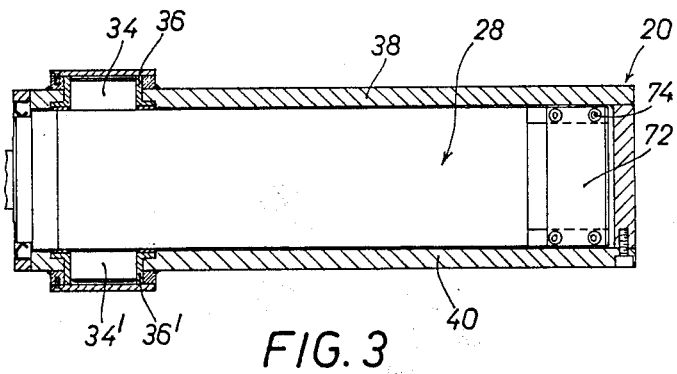
FIG. 3 is a diagrammatic side view of the system of FIG. 2, in which for greater clearness the drive motor means have been excluded.
Figure 5:
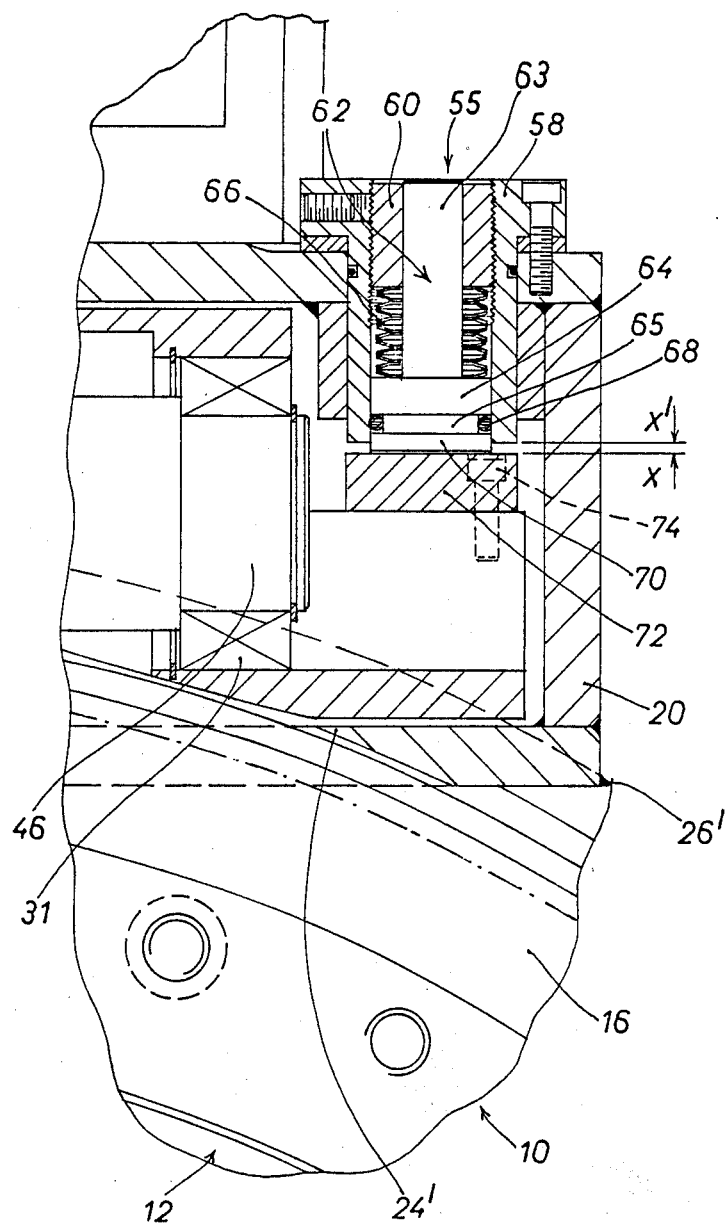
FIG. 5 is a detail view of a biasing device for the improved system.

Referring to FIGS. 1, 2 and 3, indicated by 10 is a circular structure of welded metal carpentry in the interior of which a worm gear 16 coupled to a worm 18 is rotatably mounted on a bearing (not shown).

The circular structure 10 is formed by a plane base 12 and a circular rim 14 arranged perpendicularly to the base 12 and having a height greater than that of the worm gear 16, the rim 14 being adapted to form a seat for supporting a cover (not shown) for sealingly retaining lubricating oil for the rotating members.

In its circular development the rim 14 has an interruption adjacent the worm 18 to produce an aperture 24 such as to permit the worm 18 to be coupled to the worm gear 16.

The tapering side edges of the aperture 24 are indicated by the reference numerals 24' and 24".

A casing 20 of welded sheet metal in the form of a parallelepiped box extends radially from the aperture 24 and is connected to the circular rim 14 at junction points 26 and 26'.

Arranged in the interior of casing 20 is a movable coupling assembly 28 carrying in its interior the worm 18. The assembly 28 is formed by a box 30 of sealingly welded sheet metal, in the interior of which, at the side ends, a pair of bearings 31 and 32 are accommodated, the bearing 31 being of the fixed rotary type whereas the bearing 32 is of the oscillating rotary type.

At one end the box 30 is hingedly mounted on a pair of pivots 34 and 34' arranged perpendicularly to the axis of rotation of the worm 18 and acting as a fulcrum to permit the assembly 28 to make angular movements along an arc of circle. The pivots 34 and 34' are rotatably mounted in the interior of a pair of sleeves 36 and 36' shown in FIG. 3 and fixed on an upper wall 38 and a lower wall 40 of the box type casing 20, respectively.

The worm 18 comprises a central body 42 formed with worm teeth 44, and a pair of shafts 46 and 48 which extend from the two sides of the central body 42 to be fixed to the bearings 31 and 32, respectively.

Further, on the shaft 48, which extends outwardly of the box type casing 20, there is fixed a pinion 50 meshing with a chain 52 set in rotation by an electric motor 54 driven at pulsed intervals by appropriate means, not shown, as they are known to one skilled in the art.

Arranged at the end opposed to that of pivotal connection is a pushing device 55 acting on the movable assembly 28. The device 55 is formed by a flanged sleeve 58 inserted in a circular hole made in a side wall 56 of the box type casing 20.

The inner surface of the sleeve 58 is partially threaded to permit a certain axial excursion of adjustment by means of a ring nut 60 screwed thereinto. The ring nut 60 has a central hole to permit the movement of a flat-headed pin 62 formed by a stem 63 and a flat head 65. A metal disk 64 having a central bore is movably mounted in the interior of the sleeve 58 and is supported on the head 65 of the pin 62.

A plurality of cup springs 66 is arranged between the disk 64 and the ring nut 60 to act toward the disk 64 and thus toward the head 65 of the pin 62 connected thereto.

An O-ring 68 is arranged between the disk 64 and a further disk 70 likewise movably mounted in the interior of the sleeve 58 to prevent any lubricant from leaking through between the contacting surfaces of these movable members. The disk 70 which is pushed by the pin 62 is supported on a flat tab 72 connected by screws 74 to the box 30 of the movable assembly 28.

The described improved system for the automatic recovery of play operates in the following manner:

the rotation of the pulse motor 54 is transmitted through the chain 52 and the pinion 50 to the worm 18 which by meshing with the worm gear 16 generates a thrust in a direction perpendicularly to the axis of rotation of the worm so as to shift the movable assembly 28 and the flat tab 72, connected thereto, toward the lower end of the flanged sleeve 58, thus overcoming the force exerted by the flat-headed pin 62 which is pushed by the cup springs 66 thereagainst.

It is evident that in this phase of power transmission the teeth of the gears will remain in constant engagement without any possibility of creating any play or oscillations that may be prejudicial to the members connected thereto.

During the phase of slowing down and subsequent stopping of the pulse motor 54, the cup springs 66 will overcome the thrust of the movable assembly 28, exerted thereagainst as described previously, and will shift this assembly, for example, by a value x—x' shown in FIG. 2, and will make it describe a small arc of circle which, however, will be sufficient to cause the respective teeth of the worm and worm gear to penetrate into the corresponding recesses, thus recovering any play of wear or eccentric deformation that may have been created during the multiple phases of operation.

Figure 4:
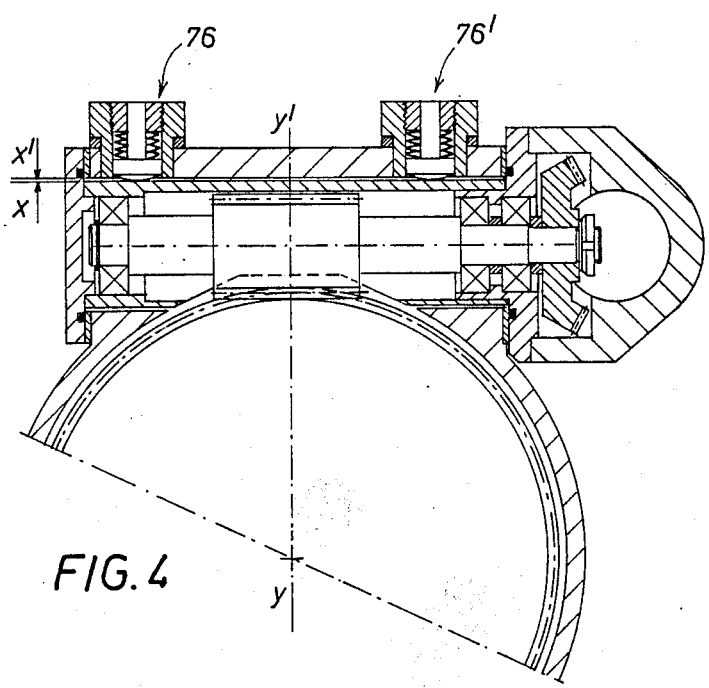
FIG. 4 is a diagrammatic plan view of a further embodiment of the system for the recovery of play according to the invention.

FIG. 4 illustrates a further embodiment of a system for the automatic recovery of play according to the invention, which differs from the embodiment shown in FIGS. 1, 2 and 3 by the elimination of the lateral pivotal connection and by the addition of a second pushing device which is indicated by the numeral 76 and associated with the pushing means 76' which is analogous to the pushing means indicated by the numeral 55 in the preceding embodiment.

The two pushing means 76, 76' are perfectly identical to each other and provide two thrusts equivalent to each other and parallel to the axis y—y' (shown in FIG. 4), thus ensuring micrometric shifting of the movable assembly of the worm in this direction and parallel to itself.

It is evident that the described and illustrated embodiments are substantially equivalent, but one may be preferable to the other depending on the mechanical characteristics (plays, dimensions, shiftings) of the device to which the system is to be applied.

Obviously some preferred embodiments of the invention have been described, but the latter is not limited to these precise embodiments and any other form or dimension of the pushing means comes within the scope of the same inventive idea as defined by the accompanying claims.

I claim:

1. An improved system for the automatic recovery of play between a worm (18) and a worm gear (16), comprising:

resilient biasing means (55) for resiliently biasing said worm toward said worm gear in a direction substantially radial to said worm gear, said biasing means being accommodated in a seat formed by a flanged sleeve (58) threaded-inwardly and carrying a screwed-on ring nut (60) having a central hole, a flat-headed pin (62) slidably-mounted in the interior of said sleeve and forming a pushing means for a plurality of cup springs (66) arranged between said ring nut and said pin.

2. An improved system as claimed in claim 1 wherein said worm is pivotally-mounted at one end, and said resilient biasing means is arranged at the opposed end of said worm.

3. An improved system as claimed in claim 1 wherein said resilient biasing means is arranged at both ends of said worm.

4. An improved system as claimed in claim 1 wherein said worm is rotatably-mounted in a movable box and radially-biased by said resilient biasing means.

5. An improved system as claimed in claim 1 wherein said worm is accommodated in a movable assembly pivotally mounted at one end by a pair of pivots arranged perpendicularly to the axis of rotation of said worm in the interior of a pair of sleeves fixed on an upper wall and a lower wall of a box type casing, said movable assembly being resiliently-biased at the opposite end by said resilient biasing means.

6. An improved system as claimed in claim 1 further comprising:

a movable assembly (28) carrying said worm in its interior, said movable assembly being provided at its respective ends with two of said resilient biasing means (76, 76').

7. A worm unit for automatically recovering play between a worm and a worm gear, comprising:

a worm casing mounted to a worm gear casing, said worm pivotably-mounted at an end of said worm casing;

a biasing device mounted at an opposite end of said worm casing and adapted to bias said worm toward said worm gear in a direction substantially radial to said worm gear;

a cylindrical sleeve mounted on said worm casing;

a ring nut threadably-inserted in said sleeve;

a pin formed with a stem and a head, said stem slidably-positioned in said ring nut and said head slidably-positioned in said sleeve; and a spring positioned on said stem between said ring nut and said sleeve.

* * * * *